(12) United States Patent
Evans

(10) Patent No.: US 8,520,001 B2
(45) Date of Patent: *Aug. 27, 2013

(54) SYSTEM AND METHOD FOR THEMATICALLY ARRANGING CLUSTERS IN A VISUAL DISPLAY

(75) Inventor: Lynne Marie Evans, Renton, WA (US)

(73) Assignee: FTI Technology LLC, Annapolis, MD (US)

(*) Notice: Subject to any disclaimer, the term of this patent is extended or adjusted under 35 U.S.C. 154(b) by 291 days.

This patent is subject to a terminal disclaimer.

(21) Appl. No.: 12/606,075

(22) Filed: Oct. 26, 2009

(65) Prior Publication Data

US 2010/0039431 A1  Feb. 18, 2010

Related U.S. Application Data

(63) Continuation of application No. 11/901,537, filed on Sep. 17, 2007, now Pat. No. 7,609,267, which is a continuation of application No. 10/084,401, filed on Feb. 25, 2002, now Pat. No. 7,271,804.

(51) Int. Cl.
*G06T 11/20* (2006.01)
(52) U.S. Cl.
USPC .......................................................... 345/440
(58) Field of Classification Search
CPC .................................................... G06T 11/206
USPC .................................................. 345/440, 635
See application file for complete search history.

(56) References Cited

U.S. PATENT DOCUMENTS

| 3,416,150 | A | 12/1968 | Lindberg |
| 3,426,210 | A | 2/1969 | Agin |
| 3,668,658 | A | 6/1972 | Flores et al. |
| 4,893,253 | A | 1/1990 | Lodder |
| 5,056,021 | A | 10/1991 | Ausborn |
| 5,121,338 | A | 6/1992 | Lodder |

(Continued)

FOREIGN PATENT DOCUMENTS

| EP | 1024437 | 8/2000 |
| EP | 1049030 | 11/2000 |

(Continued)

OTHER PUBLICATIONS

Jain et al., "Data Clustering: A Review," ACM Computing Surveys, vol. 31, No. 3, Sep. 1999, pp. 264-323, New York, NY, USA.
Ryall et al., "An Interactive Constraint-Based System for Drawing Graphs," UIST '97 Proceedings of the 10th Annual ACM Symposium on User Interface Software and Technology, pp. 97-104 (1997).
Slaney et al., "Multimedia Edges: Finding Hierarchy in all Dimensions" Proc. 9-th ACM Intl. Conf. on Multimedia, pp. 29-40, ISBN. 1-58113-394-4, Sep. 30, 2001, XP002295016 Ottawa (Sep. 3, 2001).

(Continued)

*Primary Examiner* — Jeffery A Brier
(74) *Attorney, Agent, or Firm* — Patrick J. S. Inouye; Krista A. Wittman

(57) ABSTRACT

A system and method for thematically arranging clusters in a visual display is provided. Stored clusters each include one or more concepts. The concepts include terms having a common semantic meaning. Two or more of the clusters with shared concepts are identified. The two or more clusters are placed along a vector to form one or more cluster spines each represented by the shared concepts as a theme. One of the cluster spines is selected. At least one anchor point located on an open edge of one of the clusters along the selected cluster spine is identified. A further cluster spine that is thematically-related to the selected cluster spine is identified. The further cluster spine is grafted onto one of the at least one anchor points of the selected cluster spine. The grafted cluster spines are displayed.

20 Claims, 15 Drawing Sheets

(56) References Cited

U.S. PATENT DOCUMENTS

| | | |
|---|---|---|
| 5,133,067 A | 7/1992 | Hara et al. |
| 5,278,980 A | 1/1994 | Pedersen et al. |
| 5,371,673 A | 12/1994 | Fan |
| 5,442,778 A | 8/1995 | Pedersen et al. |
| 5,477,451 A | 12/1995 | Brown et al. |
| 5,488,725 A | 1/1996 | Turtle et al. |
| 5,524,177 A | 6/1996 | Suzuoka |
| 5,528,735 A | 6/1996 | Strasnick et al. |
| 5,619,632 A | 4/1997 | Lamping et al. |
| 5,619,709 A | 4/1997 | Caid et al. |
| 5,635,929 A | 6/1997 | Rabowsky et al. |
| 5,649,193 A | 7/1997 | Sumita et al. |
| 5,675,819 A | 10/1997 | Schuetze |
| 5,696,962 A | 12/1997 | Kupiec |
| 5,737,734 A | 4/1998 | Schultz |
| 5,754,938 A | 5/1998 | Herz et al. |
| 5,794,236 A | 8/1998 | Mehrle |
| 5,799,276 A | 8/1998 | Komissarchik et al. |
| 5,819,258 A | 10/1998 | Vaithyanathan et al. |
| 5,842,203 A | 11/1998 | D'Elena et al. |
| 5,844,991 A | 12/1998 | Hochberg et al. |
| 5,857,179 A | 1/1999 | Vaithyanathan et al. |
| 5,860,136 A | 1/1999 | Fenner |
| 5,862,325 A | 1/1999 | Reed et al. |
| 5,864,846 A | 1/1999 | Voorhees et al. |
| 5,864,871 A | 1/1999 | Kitain et al. |
| 5,867,799 A | 2/1999 | Lang et al. |
| 5,870,740 A | 2/1999 | Rose et al. |
| 5,909,677 A | 6/1999 | Broder et al. |
| 5,915,024 A | 6/1999 | Kitaori et al. |
| 5,920,854 A | 7/1999 | Kirsch et al. |
| 5,924,105 A | 7/1999 | Punch et al. |
| 5,940,821 A | 8/1999 | Wical |
| 5,950,146 A | 9/1999 | Vapnik |
| 5,950,189 A | 9/1999 | Cohen et al. |
| 5,966,126 A | 10/1999 | Szabo |
| 5,987,446 A | 11/1999 | Corey et al. |
| 6,006,221 A | 12/1999 | Liddy et al. |
| 6,012,053 A | 1/2000 | Pant et al. |
| 6,026,397 A | 2/2000 | Sheppard |
| 6,038,574 A | 3/2000 | Pitkow et al. |
| 6,070,133 A | 5/2000 | Brewster et al. |
| 6,089,742 A | 7/2000 | Warmerdam et al. |
| 6,092,059 A | 7/2000 | Straforini et al. |
| 6,094,649 A | 7/2000 | Bowen et al. |
| 6,100,901 A | 8/2000 | Mohda et al. |
| 6,119,124 A | 9/2000 | Broder et al. |
| 6,122,628 A | 9/2000 | Castelli et al. |
| 6,137,499 A | 10/2000 | Tesler |
| 6,137,545 A | 10/2000 | Patel et al. |
| 6,137,911 A | 10/2000 | Zhilyaev |
| 6,148,102 A | 11/2000 | Stolin |
| 6,154,219 A | 11/2000 | Wiley et al. |
| 6,167,368 A | 12/2000 | Wacholder |
| 6,173,275 B1 | 1/2001 | Caid et al. |
| 6,202,064 B1 | 3/2001 | Julliard |
| 6,216,123 B1 | 4/2001 | Robertson et al. |
| 6,243,713 B1 | 6/2001 | Nelson et al. |
| 6,243,724 B1 | 6/2001 | Mander et al. |
| 6,260,038 B1 | 7/2001 | Martin et al. |
| 6,326,962 B1 | 12/2001 | Szabo |
| 6,338,062 B1 | 1/2002 | Liu |
| 6,345,243 B1 | 2/2002 | Clark |
| 6,349,296 B1 | 2/2002 | Broder et al. |
| 6,349,307 B1 | 2/2002 | Chen |
| 6,360,227 B1 | 3/2002 | Aggarwal et al. |
| 6,377,287 B1 | 4/2002 | Hao et al. |
| 6,381,601 B1 | 4/2002 | Fujiwara et al. |
| 6,389,433 B1 | 5/2002 | Bolonsky et al. |
| 6,389,436 B1 | 5/2002 | Chakrabarti et al. |
| 6,408,294 B1 | 6/2002 | Getchius et al. |
| 6,414,677 B1 | 7/2002 | Robertson et al. |
| 6,415,283 B1 | 7/2002 | Conklin |
| 6,418,431 B1 | 7/2002 | Mahajan et al. |
| 6,421,709 B1 | 7/2002 | McCormick et al. |
| 6,438,537 B1 | 8/2002 | Netz et al. |
| 6,438,564 B1 | 8/2002 | Morton et al. |
| 6,442,592 B1 | 8/2002 | Alumbaugh et al. |
| 6,446,061 B1 | 9/2002 | Doerre et al. |
| 6,449,612 B1 | 9/2002 | Bradley et al. |
| 6,453,327 B1 | 9/2002 | Nielsen |
| 6,460,034 B1 | 10/2002 | Wical |
| 6,470,307 B1 | 10/2002 | Turney |
| 6,480,843 B2 | 11/2002 | Li |
| 6,480,885 B1 | 11/2002 | Olivier |
| 6,484,168 B1 | 11/2002 | Pennock et al. |
| 6,484,196 B1 | 11/2002 | Maurille |
| 6,493,703 B1 | 12/2002 | Knight et al. |
| 6,496,822 B2 | 12/2002 | Rosenfelt et al. |
| 6,502,081 B1 | 12/2002 | Wiltshire, Jr. et al. |
| 6,507,847 B1 | 1/2003 | Fleischman |
| 6,510,406 B1 | 1/2003 | Marchisio |
| 6,519,580 B1 | 2/2003 | Johnson et al. |
| 6,523,026 B1 | 2/2003 | Gillis |
| 6,523,063 B1 | 2/2003 | Miller et al. |
| 6,542,889 B1 | 4/2003 | Aggarwal et al. |
| 6,544,123 B1 | 4/2003 | Tanaka et al. |
| 6,549,957 B1 | 4/2003 | Hanson et al. |
| 6,560,597 B1 | 5/2003 | Dhillon et al. |
| 6,571,225 B1 | 5/2003 | Oles et al. |
| 6,584,564 B2 | 6/2003 | Olkin et al. |
| 6,594,658 B2 | 7/2003 | Woods |
| 6,598,054 B2 | 7/2003 | Schuetze et al. |
| 6,606,625 B1 | 8/2003 | Muslea et al. |
| 6,611,825 B1 | 8/2003 | Billheimer et al. |
| 6,628,304 B2 | 9/2003 | Mitchell et al. |
| 6,629,097 B1 | 9/2003 | Keith |
| 6,651,057 B1 | 11/2003 | Jin et al. |
| 6,654,739 B1 | 11/2003 | Apte et al. |
| 6,658,423 B1 | 12/2003 | Pugh et al. |
| 6,675,159 B1 | 1/2004 | Lin et al. |
| 6,675,164 B2 | 1/2004 | Kamath et al. |
| 6,678,705 B1 | 1/2004 | Berchtold et al. |
| 6,684,205 B1 | 1/2004 | Modha et al. |
| 6,697,998 B1 | 2/2004 | Damerau et al. |
| 6,701,305 B1 | 3/2004 | Holt et al. |
| 6,711,585 B1 | 3/2004 | Copperman et al. |
| 6,714,929 B1 | 3/2004 | Micaelian et al. |
| 6,735,578 B2 | 5/2004 | Shetty et al. |
| 6,738,759 B1 | 5/2004 | Wheeler et al. |
| 6,747,646 B2 | 6/2004 | Gueziec et al. |
| 6,751,628 B2 | 6/2004 | Coady |
| 6,757,646 B2 | 6/2004 | Marchisio |
| 6,785,679 B1 | 8/2004 | Dane et al. |
| 6,804,665 B2 | 10/2004 | Kreulen et al. |
| 6,816,175 B1 | 11/2004 | Hamp et al. |
| 6,819,344 B2 | 11/2004 | Robbins |
| 6,823,333 B2 | 11/2004 | McGreevy |
| 6,841,321 B2 | 1/2005 | Matsumoto et al. |
| 6,862,710 B1 | 3/2005 | Marchisio |
| 6,879,332 B2 | 4/2005 | Decombe |
| 6,883,001 B2 | 4/2005 | Abe |
| 6,888,584 B2 | 5/2005 | Suzuki et al. |
| 6,915,308 B1 | 7/2005 | Evans et al. |
| 6,922,699 B2 | 7/2005 | Schuetze et al. |
| 6,941,325 B1 | 9/2005 | Benitez et al. |
| 6,970,881 B1 | 11/2005 | Mohan et al. |
| 6,978,419 B1 | 12/2005 | Kantrowitz |
| 6,990,238 B1 | 1/2006 | Saffer et al. |
| 7,003,551 B2 | 2/2006 | Malik |
| 7,013,435 B2 | 3/2006 | Gallo et al. |
| 7,020,645 B2 | 3/2006 | Bisbee et al. |
| 7,051,017 B2 | 5/2006 | Marchisio |
| 7,054,870 B2 | 5/2006 | Holbrook |
| 7,080,320 B2 | 7/2006 | Ono |
| 7,096,431 B2 | 8/2006 | Tambata et al. |
| 7,099,819 B2 | 8/2006 | Sakai et al. |
| 7,117,246 B2 | 10/2006 | Christenson et al. |
| 7,130,807 B1 | 10/2006 | Mikurak |
| 7,137,075 B2 | 11/2006 | Hoshino et al. |
| 7,155,668 B2 | 12/2006 | Holland et al. |
| 7,194,458 B1 | 3/2007 | Micaelian et al. |
| 7,194,483 B1 | 3/2007 | Mohan et al. |
| 7,209,949 B2 | 4/2007 | Mousseau et al. |

| | | | |
|---|---|---|---|
| 7,233,886 | B2 | 6/2007 | Wegerich et al. |
| 7,233,940 | B2 | 6/2007 | Bamberger et al. |
| 7,240,199 | B2 | 7/2007 | Tomkow |
| 7,251,637 | B1 | 7/2007 | Caid et al. |
| 7,266,365 | B2 | 9/2007 | Ferguson et al. |
| 7,266,545 | B2 | 9/2007 | Bergman et al. |
| 7,269,598 | B2 | 9/2007 | Marchisio |
| 7,271,804 | B2 * | 9/2007 | Evans ............................ 345/440 |
| 7,277,919 | B1 | 10/2007 | Dohono et al. |
| 7,325,127 | B2 | 1/2008 | Olkin et al. |
| 7,353,204 | B2 | 4/2008 | Liu |
| 7,363,243 | B2 | 4/2008 | Arnett et al. |
| 7,366,759 | B2 | 4/2008 | Trevithick et al. |
| 7,379,913 | B2 | 5/2008 | Steele et al. |
| 7,383,282 | B2 | 6/2008 | Whitehead et al. |
| 7,401,087 | B2 | 7/2008 | Copperman et al. |
| 7,412,462 | B2 | 8/2008 | Margolus et al. |
| 7,418,397 | B2 | 8/2008 | Kojima et al. |
| 7,444,356 | B2 | 10/2008 | Calistri-Yeh et al. |
| 7,457,948 | B1 | 11/2008 | Bilicksa et al. |
| 7,490,092 | B2 | 2/2009 | Sibley et al. |
| 7,523,349 | B2 | 4/2009 | Barras |
| 7,571,177 | B2 | 8/2009 | Damle |
| 7,609,267 | B2 * | 10/2009 | Evans ............................ 345/440 |
| 7,698,167 | B2 | 4/2010 | Batham et al. |
| 2002/0032735 | A1 | 3/2002 | Burnstein et al. |
| 2002/0065912 | A1 | 5/2002 | Catchpole et al. |
| 2002/0078090 | A1 | 6/2002 | Hwang et al. |
| 2002/0122543 | A1 | 9/2002 | Rowen |
| 2002/0184193 | A1 | 12/2002 | Cohen |
| 2003/0130991 | A1 | 7/2003 | Reijerse et al. |
| 2007/0020642 | A1 | 1/2007 | Deng et al. |

FOREIGN PATENT DOCUMENTS

| | | |
|---|---|---|
| EP | 0886227 | 10/2003 |
| WO | 0067162 | 11/2000 |
| WO | 03052627 | 6/2003 |

OTHER PUBLICATIONS

T. Kohonen, "Self-Organizing Maps," Ch. 1-2, Springer-Verlag (3rd ed.) (2001).
Anna Sachinopoulou, "Multidimensional Visualization," Technical Research Centre of Finland, ESPOO 2001, VTT Research Notes 2114, pp. 1-37 (2001).
Dan Sullivan, "Document Warehousing and Text Mining: Techniques for Improving Business Operations, Marketing and Sales," Ch. 1-3, John Wiley & Sons, New York, NY (2001).
Jiang Linhui, "K-Mean Algorithm: Iterative Partitioning Clustering Algorithm," http://www.cs.regina.ca/-linhui/K.sub.--mean.sub.--algorithm.html, (2001) Computer Science Department, University of Regina, Saskatchewan, Canada (2001).
Kazumasa Ozawa, "A Stratificational Overlapping Cluster Scheme," Information Science Center, Osaka Electro-Communication University, Neyagawa-shi, Osaka 572, Japan, Pattern Recognition, vol. 18, pp. 279-286 (1985).
F. Can, Incremental Clustering for Dynamic Information Processing: ACM Transactions on Information Systems, ACM, New York, NY, US, vol. 11, No. 2, pp. 143-164, XP-002308022 (Apr. 1993).
Bier et al. "Toolglass and Magic Lenses: The See-Through Interface", Computer Graphics Proceedings, Proceedings of Siggraph Annual International Conference on Computer Graphics and Interactive Techniques, pp, 73-80, XP000879378 (Aug. 1993).
Shuldberg et al., "Distilling Information from Text: The EDS TemplateFiller System," Journal of the American Society for Information Science, vol. 44, pp. 493-507 (1993).
V. Faber, "Clustering and the Continuous K-Means Algorithm," Los Alamos Science, The Laboratory, Los Alamos, NM, US, No. 22, Jan. 1, 1994, pp. 138-144 (Jan. 1, 1994).
Lam et al., "A Sliding Window Technique for Word Recognition," SPIE, vol. 2422, pp. 38-46, Center of Excellence for Document Analysis and Recognition, State University of New Yrok at Baffalo, NY, USA (1995).
http://em-ntserver.unl.edu/Math/mathweb/vecors/vectors.html © 1997.
North et al. "A Taxonomy of Multiple Window Coordinations," Institute for Systems Research & Department of Computer Science, University of Maryland, Maryland, USA, http://www.cs.umd.edu/localphp/hcil/tech-reports-search.php?number=97-18 (1997).
B.B. Hubbard, "The World According the Wavelet: The Story of a Mathematical Technique in the Making," AK Peters (2nd ed.), pp. 227-229, Massachusetts, USA (1998).
Whiting et al., "Image Quantization: Statistics and Modeling," SPIE Conference of Physics of Medical Imaging, San Diego, CA, USA , vol. 3336, pp. 260-271 (Feb. 1998).
Miller et al., "Topic Islands: A Wavelet Based Text Visualization System," Proceedings of the IEEE Visualization Conference. 1998, pp. 189-196.
Fekete et al., "Excentric Labeling: Dynamic Neighborhood Labeling for Data Visualization," CHI 1999 Conference Proceedings Human Factors in Computing Systems, Pittsburgh, PA, pp. 512-519 (May 15-20, 1999).
Baeza-Yates et al., "Modern Information Retrieval," Ch. 2 "Modeling," Modern Information Retrieval, Harlow: Addison-Wesley, Great Britain 1999, pp. 18-71 (1999).
Osborn, James. et al., "Justice: A Judicial Search Tool Using Intelligent Concept Extraction," ICAIL, 1999, pp. 173-181, ACM, Oslo, Norway (1999).
Pelleg et al., "Accelerating Exact K-Means Algorithms With Geometric Reasoning," pp. 277-281, CONF on Knowledge Discovery in Data, PROC fifth ACM SIGKDD (1999).
Lio et al., "Funding Pathogenicity Islands and Gene Transfer Events in Genome Data," Bioinformatics, vol. 16, pp. 932-940, Department of Zoology, University of Cambridge, UK (Jan. 25, 2000).
Kanungo et al., "The Analysis of a Simple K-Means Clustering Algorithm," pp. 100-109, PROC 16th annual symposium of computational geometry (May 2000).
M. Kurimo, "Fast Latent Semantic Indexing of Spoken Documents by Using Self-Organizing Maps" IEEE International Conference on Accoustics, Speech, and Signal Processing, vol. 6, pp. 2425-2428 (Jun. 2000).
G. Magarshak, Theory & Practice. Issue 01. May 17, 2000. http://www.flipcode.com/articles/tp.sub.--issue01-pf.shtml (May 17, 2000).
Davison et al., "Brute Force Estimation of the Number of Human Genes Using EST Clustering as a Measure," IBM Journal of Research & Development, vol. 45, pp. 439-447 (May 2001).
Artero et al., "Viz3D: Effective Exploratory Visualization of Large Multidimensional Data Sets," IEEE Computer Graphics and Image Processing 2004, pp. 340-347 (Oct. 20, 2004).
Horn, RE "Visual Language: Global Communication for the 21st Century," 1998, pp. 51-92, Bainbridge, Washington, USA.
Hiroyuki Kawano, "Overview of Mondou Web Search Engine Using Text Mining and Information Visualizing Technologies," IEEE, 2001, pp. 234-241.
James Osborn et al., "Justice: A Judicial Search Tool Using Intelligent Concept Extraction," ICAIL-99, 1999, pp. 173-181, ACM.
Chen an et al., "Fuzzy Concept Graph and Application in Web Document Clustering," 2001, pp. 101-106, IEEE.
V. Estivill-Castro and I. Lee: "AMOEBA: Hierarchical Clustering Based on Spatial Proximity using Delaunay Triangulation", 1999 ACM SIGMOD Internatonal Conference on Management of Data, vol. 28, No. 2, Jun. 1-3, 1999, pp. 49-60, Philadelphia, PA, USA.
P. Eades, F. Qing-Wen: "Multilevel Visualization of Clustered Graphs" Proceedings of Graph Drawing '96, Lecture Notes in Computer Science, NR. 1190, Sep. 18-20, 1996, pp. 101-112, Berkeley, CA, USA ISBN: 3-540-62495-3.
P. Eades, Quing-Wen Fen: "Orthogonal grid drawing of clustered graphs" Technical Report 96-04, [Online] University of Newcastle, AU Retrieved from the internet: URL:http://citeseer.ist.psu.edu/eades96ort hogonal.html>[retrieved on May 29, 2006].

* cited by examiner

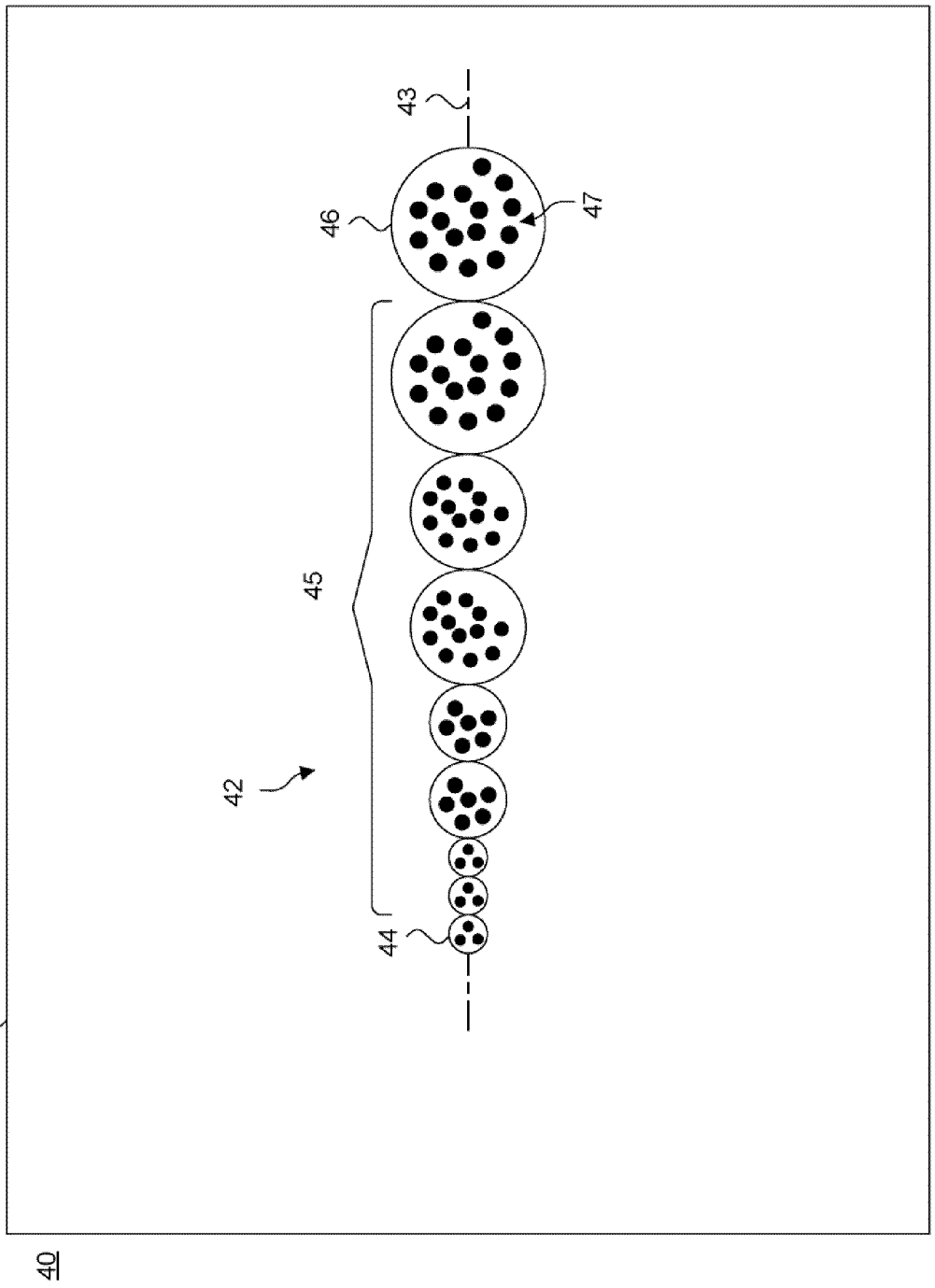

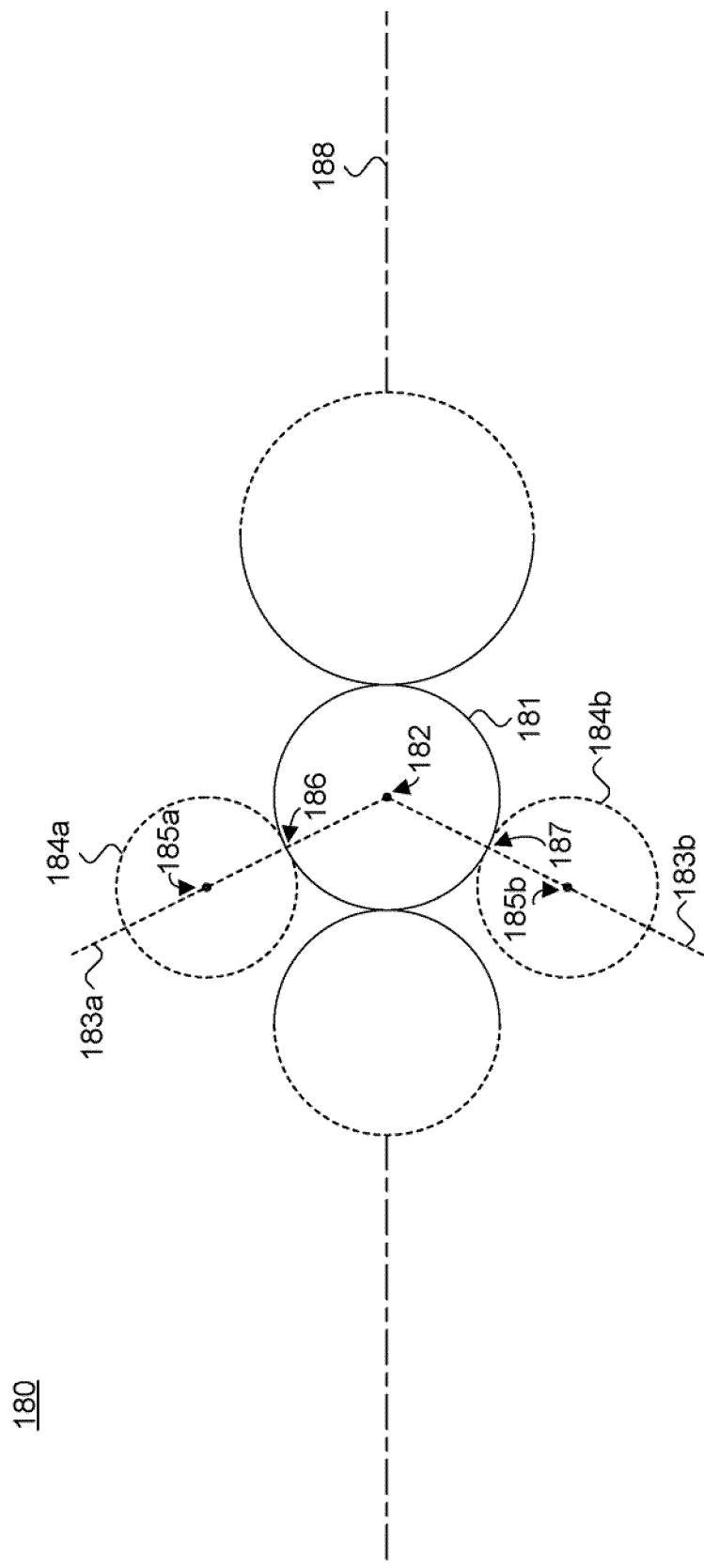

SYSTEM AND METHOD FOR THEMATICALLY ARRANGING CLUSTERS IN A VISUAL DISPLAY

CROSS-REFERENCE TO RELATED APPLICATIONS

This patent application is a continuation of U.S. patent application Ser. No. 11/901,537, filed Sep. 17, 2007, now U.S. Pat. No. 7,609,267, issued on Oct. 27, 2009, which is a continuation of U.S. patent application Ser. No. 10/084,401, filed Feb. 25, 2002, now U.S. Pat. No. 7,271,804, issued Sep. 18, 2007, the priority dates of which are claimed and the disclosures of which are incorporated by reference.

FIELD

The present invention relates in general to data visualization and, in particular, to a system and method for thematically arranging clusters in a visual display.

BACKGROUND

Computer-based data visualization involves the generation and presentation of idealized data on a physical output device, such as a cathode ray tube (CRT), liquid crystal diode (LCD) display, printer and the like. Computer systems visualize data through graphical user interfaces (GUIs), which allow intuitive user interaction and high quality presentation of synthesized information.

The importance of effective data visualization has grown in step with advances in computational resources. Faster processors and larger memory sizes have enabled the application of complex visualization techniques to operate in multi-dimensional concept space. As well, the interconnectivity provided by networks, including intranetworks and internetworks, such as the Internet, enable the communication of large volumes of information to a wide-ranging audience. Effective data visualization techniques are needed to interpret information and model content interpretation.

The use of a visualization language can enhance the effectiveness of data visualization by communicating words, images and shapes as a single, integrated unit. Visualization languages help bridge the gap between the natural perception of a physical environment and the artificial modeling of information within the constraints of a computer system. As raw information cannot always be digested as written words, data visualization attempts to complement and, in some instances, supplant the written word for a more intuitive visual presentation drawing on natural cognitive skills.

Effective data visualization is constrained by the physical limits of computer display systems. Two-dimensional and three-dimensional information can be readily displayed. However, n-dimensional information in excess of three dimensions must be artificially compressed. Careful use of color, shape and temporal attributes can simulate multiple dimensions, but comprehension and usability become difficult as additional layers of modeling are artificially grafted into the finite bounds of display capabilities.

Thus, mapping multi-dimensional information into a two- or three-dimensional space presents a problem. Physical displays are practically limited to three dimensions. Compressing multi-dimensional information into three dimensions can mislead, for instance, the viewer through an erroneous interpretation of spatial relationships between individual display objects. Other factors further complicate the interpretation and perception of visualized data, based on the Gestalt principles of proximity, similarity, closed region, connectedness, good continuation, and closure, such as described in R. E. Horn, "Visual Language: Global Communication for the 21st Century," Ch. 3, Macro VU Press (1998), the disclosure of which is incorporated by reference.

In particular, the misperception of visualized data can cause a misinterpretation of, for instance, dependent variables as independent and independent variables as dependent. This type of problem occurs, for example, when visualizing clustered data, which presents discrete groupings of data, which are misperceived as being overlaid or overlapping due to the spatial limitations of a three-dimensional space.

Consider, for example, a group of clusters, each cluster visualized in the form of a circle defining a center and a fixed radius. Each cluster is located some distance from a common origin along a vector measured at a fixed angle from a common axis through the common origin. The radii and distances are independent variables relative to the other clusters and the radius is an independent variable relative to the common origin. In this example, each cluster represents a grouping of points corresponding to objects sharing a common set of traits. The radius of the cluster reflects the relative number of objects contained in the grouping. Clusters located along the same vector are similar in theme as are those clusters located on vectors having a small cosine rotation from each other. Thus, the angle relative to a common axis' distance from a common origin is an independent variable with a correlation between the distance and angle reflecting relative similarity of theme. Each radius is an independent variable representative of volume. When displayed, the overlaying or overlapping of clusters could mislead the viewer into perceiving data dependencies where there are none.

Therefore, there is a need for an approach to presenting arbitrarily dimensioned data in a finite-dimensioned display space while preserving independent data relationships. Preferably, such an approach would organize the data according to theme and place thematically-related clusters into linear spatial arrangements to maximize the number of relationships depicted.

There is a further need for an approach to selecting and orienting data clusters to properly visualize independent and dependent variables while compressing thematic relationships for display.

SUMMARY

The present invention provides a system and method for organizing and placing groupings of thematically-related clusters in a visual display space. Each cluster size equals the number of concepts (related documents) contained in the cluster. Clusters sharing a common theme are identified. Individual lists of thematically-related clusters are sorted and categorized into sublists of placeable clusters. Anchor points within each sublist are identified. Each anchor point has at least one open edge at which to graft other thematically-related cluster sublists. Cluster sublists are combined at the anchor points to form groupings, which are placed into the visual display space. The most thematically-relevant cluster grouping is placed at the center of the visual display space.

An embodiment provides a system and method for thematically arranging clusters in a visual display. Stored clusters each include one or more concepts. The concepts include terms having a common semantic meaning. Two or more of the clusters with shared concepts are identified. The two or more clusters are placed along a vector to form one or more cluster spines each represented by the shared concepts as a theme. One of the cluster spines is selected. At least one anchor point located on an open edge of one of the clusters along the selected cluster spine is identified. A further cluster spine that is thematically-related to the selected cluster spine is identified. The further cluster spine is grafted onto one of the at least one anchor points of the selected cluster spine. The grafted cluster spines are displayed.

A further embodiment provides a system and method for placing thematically-related cluster groupings into a visual display. Clusters having one or more concepts are maintained. The concepts each include terms that have common semantic meaning. Cluster spines each including two or more of the clusters with a common theme are formed by placing the two or more clusters along a vector. The theme includes the concepts shared between the two or more clusters. The cluster spines are grouped. One of the cluster spines is selected. At least one anchor point located on an open edge of at least one of the clusters along the selected cluster spine is identified. At least one remaining cluster spine that is thematically-related to the selected cluster spine is identified. The remaining cluster spine is grafted onto one of the anchor points of the selected cluster spine. The grouped cluster spines are displayed.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 3 is a data representation diagram showing, by way of example, a view of a cluster spine generated by the cluster display system of FIG. 1.

FIG. 13 is a graph showing, by way of example, an anchor point within a cluster spine generated by the cluster display system of FIG. 1.

DETAILED DESCRIPTION

Figure 1:
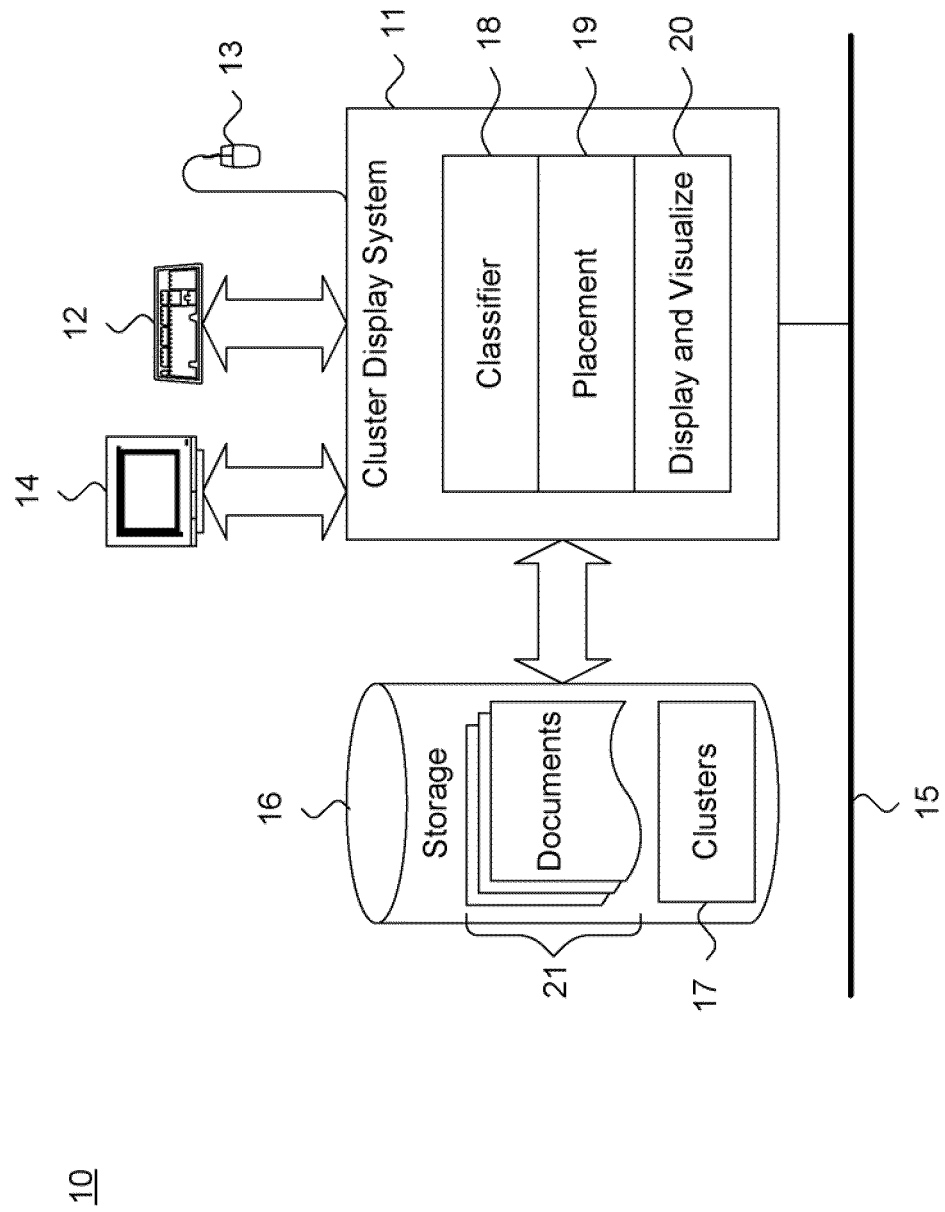
FIG. 1 is a block diagram showing a system for arranging concept clusters in thematic relationships in a two-dimensional visual display space, in accordance with the present invention.

FIG. 1 is a block diagram 10 showing a system for arranging concept clusters in thematic relationships in a two-dimensional visual display space, in accordance with the present invention. The system consists of a cluster display system 11, such as implemented on a general-purpose programmed digital computer. The cluster display system 11 is coupled to input devices, including a keyboard 12 and a pointing device 13, such as a mouse, and display 14, including a CRT, LCD display, and the like. As well, a printer (not shown) could function as an alternate display device. The cluster display system 11 includes a processor, memory and persistent storage, such as provided by a storage device 16, within which are stored clusters 17 representing visualized multi-dimensional data. The cluster display system 11 can be interconnected to other computer systems, including clients and servers, over a network 15, such as an intranetwork or internetwork, including the Internet, or various combinations and topologies thereof, as would be recognized by one skilled in the art.

Each cluster 17 represents a grouping of one or more points in a virtualized concept space, as further described below beginning with reference to FIG. 3. Preferably, the clusters 17 are stored as structured data sorted into an ordered list in ascending or descending order. In the described embodiment, each cluster represents individual concepts and themes extracted from a set of documents 21 and categorized based on, for example, Euclidean distances calculated between each pair of concepts and themes and defined within a pre-specified range of variance, such as described in common-assigned U.S. Pat. No. 6,888,548, issued May 3, 2005, the disclosure of which is incorporated by reference.

The cluster display system 11 includes three modules: classifier 18, placement 19, and display and visualize 20. The classifier module 18 sorts a list of clusters 17 into either ascending or descending order based cluster sizes. The placement module 19 selects and orients the sized clusters to properly visualize independent and dependent variables while compressing thematic relationships for visual display. The placement module 19 logically includes a list building submodule for creating sublists of placeable clusters 17, a cluster placement submodule for placing clusters 17 into displayable groupings, known as "groupers," and a grouper placement submodule for placing the groupers within a visual display area. Finally, the display and visualize module 20 performs the actual display of the clusters 17 via the display 14 responsive to commands from the input devices, including keyboard 12 and pointing device 13.

The individual computer systems, including cluster display system 11, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The cluster display system 11 operates in accordance with a sequence of process steps, as further described below with reference to FIG. 8.

Figure 2:
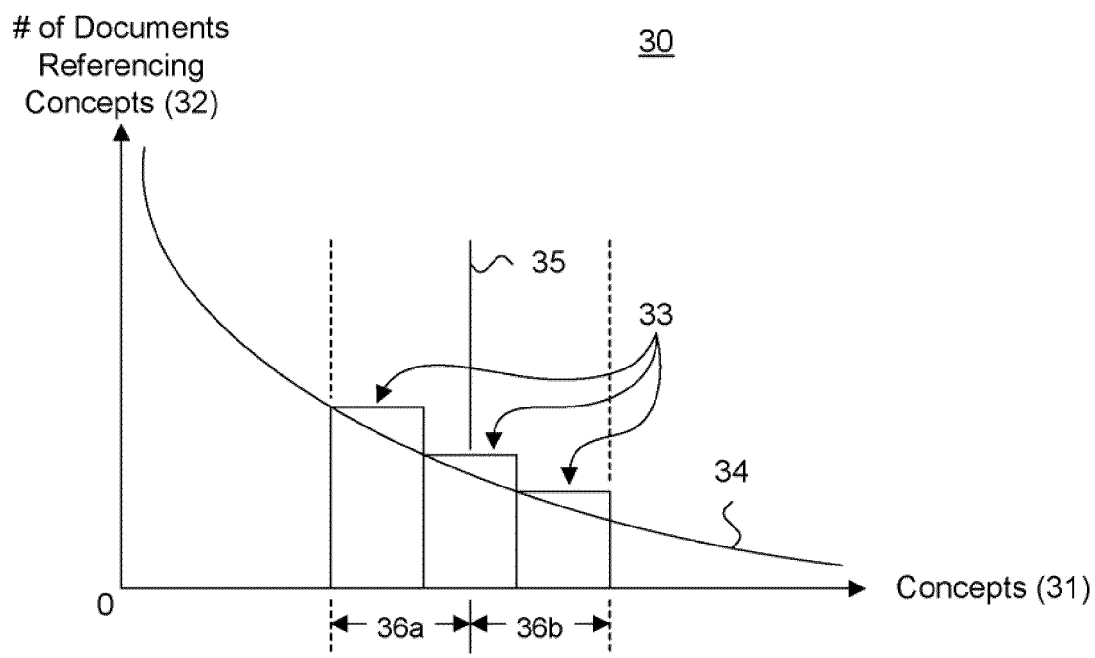
FIG. 2 is a graph showing, by way of example, a corpus graph of the frequency of concept occurrences generated by the system of FIG. 1.

FIG. 2 is a graph showing, by way of example, a corpus graph 30 of the frequency of concept occurrences generated by the system of FIG. 1. The corpus graph 30 visualizes concepts extracted from a collection of documents 21 (shown in FIG. 1) represented by weighted clusters of concepts, such as described in commonly-assigned U.S. Pat. No. 6,978,274, issued Dec. 20, 2005, the disclosure of which is incorporated by reference. The x-axis 31 defines the individual concepts for all documents 21 and the y-axis 32 defines the number of documents 21 referencing each concept. The individual concepts are mapped in order of descending frequency of occurrence 33 to generate a curve 34 representing the latent semantics of the documents set.

A median value 35 is selected and edge conditions 36*a-b* are established to discriminate between concepts which occur too frequently versus concepts which occur too infrequently. Those documents 21 falling within the edge conditions 36*a-b* form a subset of documents 21 containing latent concepts. In the described embodiment, the median value 35 is document-type dependent. For efficiency, the upper edge condition 36*b* is set to 70% and the 64 concepts immediately preceding the upper edge condition 36*b* are selected, although other forms of threshold discrimination could also be used.

FIG. 3 is a data representation diagram 40 showing, by way of example, a view 41 of a cluster spine 42 generated by the cluster display system of FIG. 1. Each cluster in the cluster spine 42, such as endpoint clusters 44 and 46 and midpoint clusters 45, group documents 21 sharing the same themes and falling within the edge conditions 36*a-b* of the corpus graph 40 (shown in FIG. 2).

In the described embodiment, cluster size equals the number of concepts contained in the cluster. The cluster spine 42 is built by identifying those clusters 44-46 sharing a common theme. A theme combines two or more concepts 47, which each group terms or phrases (not shown) with common semantic meanings. Terms and phrases are dynamically extracted from a document collection through latent concept evaluation. During cluster spine creation, those clusters 44-46 having available anchor points within each cluster spine 42 are identified for use in grafting other cluster spines sharing thematically-related concepts, as further described below with reference to FIG. 5.

The cluster spine 42 is placed into a visual display area to generate a two-dimensional spatial arrangement. To represent data inter-relatedness, the clusters 44-46 in each cluster spine 42 are placed along a vector 43 arranged in decreasing cluster size, although other line shapes and cluster orderings can be used.

Figure 4A:
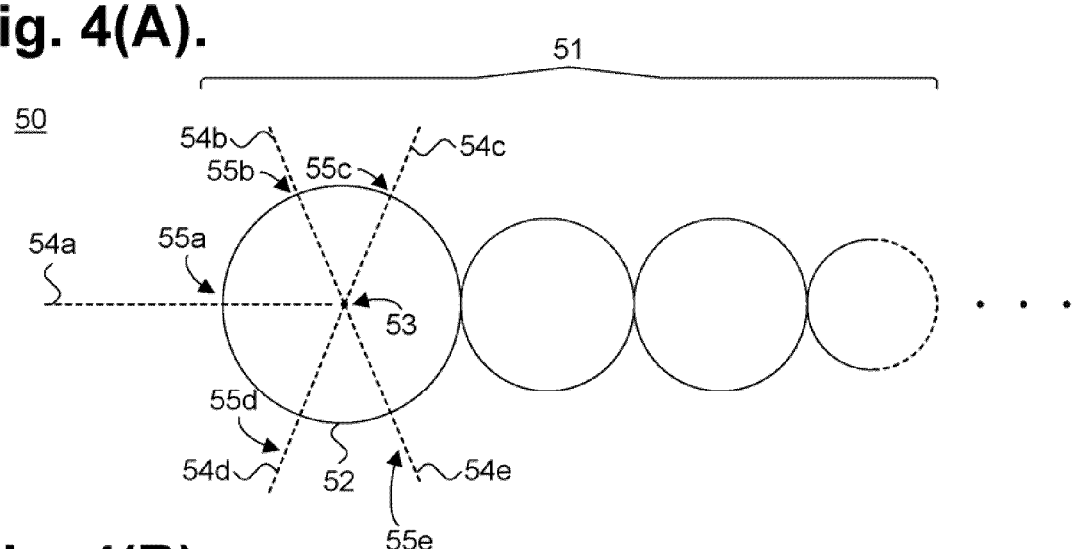
FIGS. 4(A)-(C) are data representation diagrams showing anchor points within cluster spines.
Figure 4B:
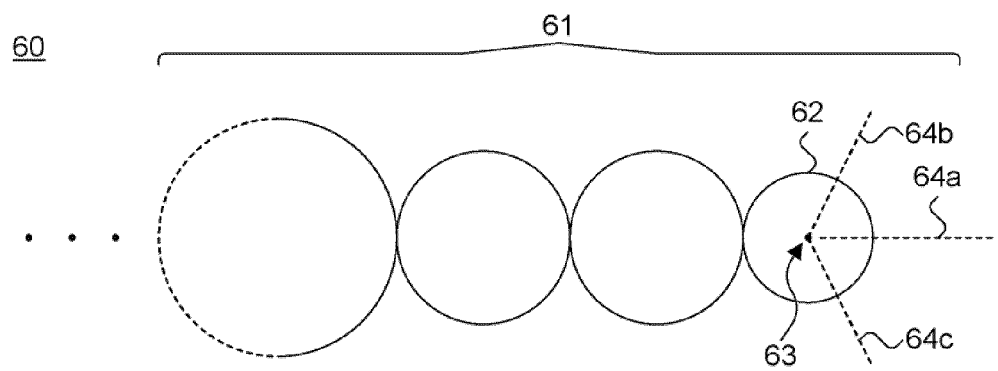
Figure 4C:
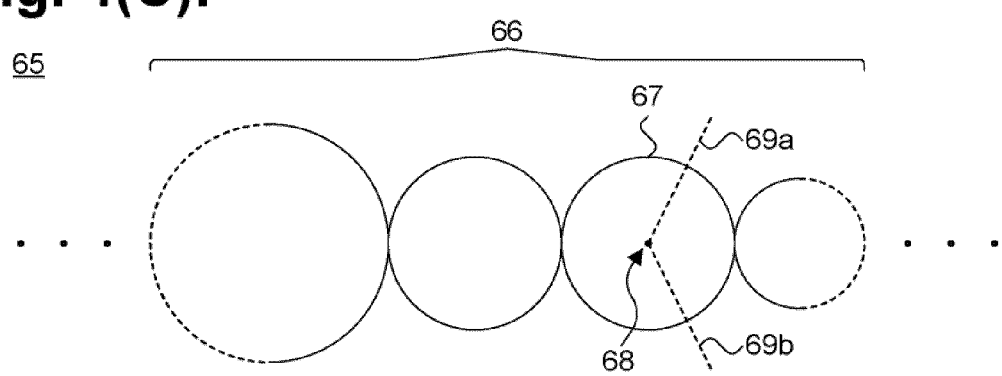

FIGS. 4(A)-(C) are data representation diagrams 50, 60, 65 respectively showing anchor points within cluster spines 51, 61, 66. A cluster having at least one open edge constitutes an anchor point. Referring first to FIG. 4(A), a largest endpoint cluster 52 of a cluster spine 51 functions as an anchor point along each open edge 55*a-e*. The endpoint cluster 52 contains the largest number of concepts.

An open edge is a point along the edge of a cluster at which another cluster can be adjacently placed. Slight overlap within 20% with other clusters is allowed. An open edge is formed by projecting vectors 54*a-c* outward from the center 53 of the endpoint cluster 52, preferably at normalized angles. The clusters in the cluster spine 51 are arranged in order of decreasing cluster size.

In the described embodiment, the normalized angles for largest endpoint clusters are at approximately ±60° to minimize interference with other spines while maximizing the degree of interrelatedness between spines. Five open edges 55*a-e* are available to graft other thematically-related cluster spines. Other evenly divisible angles could be also used. As further described below with reference to FIG. 5, other thematically-related cluster spines can be grafted to the endpoint cluster 52 at each open edge 55*a-e*.

Referring next to FIG. 4(B), a smallest endpoint cluster 62 of a cluster spine 61 also functions as an anchor point along each open edge. The endpoint cluster 62 contains the fewest number of concepts. The clusters in the cluster spine 61 are arranged in order of decreasing cluster size. An open edge is formed by projecting vectors 64*a-c* outward from the center 63 of the endpoint cluster 62, preferably at normalized angles.

In the described embodiment, the normalized angles for smallest endpoint clusters are at approximately ±60°, but only three open edges are available to graft other thematically-related cluster spines. Empirically, limiting the number of available open edges to those facing the direction of decreasing cluster size helps to maximize the interrelatedness of the overall display space.

Referring finally to FIG. 4(C), a midpoint cluster 67 of a cluster spine 61 functions as an anchor point for a cluster spine 66 along each open edge. The midpoint cluster 67 is located intermediate to the clusters in the cluster spine 66 and defines an anchor point along each open edge. An open edge is formed by projecting vectors 69*a-b* outward from the center 68 of the midpoint cluster 67, preferably at normalized angles. Unlike endpoint clusters 52, 62 the midpoint cluster 67 can only serve as an anchor point along tangential vectors non-coincident to the vector forming the cluster spine 66. Accordingly, endpoint clusters 52,62 include one additional open edge serving as a coincident anchor point.

In the described embodiment, the normalized angles for midpoint clusters are at approximately ±60°, but only two open edges are available to graft other thematically-related cluster spines. Empirically, limiting the number of available open edges to those facing the direction of decreasing cluster size helps to maximize the interrelatedness of the overall display space.

Figure 5:
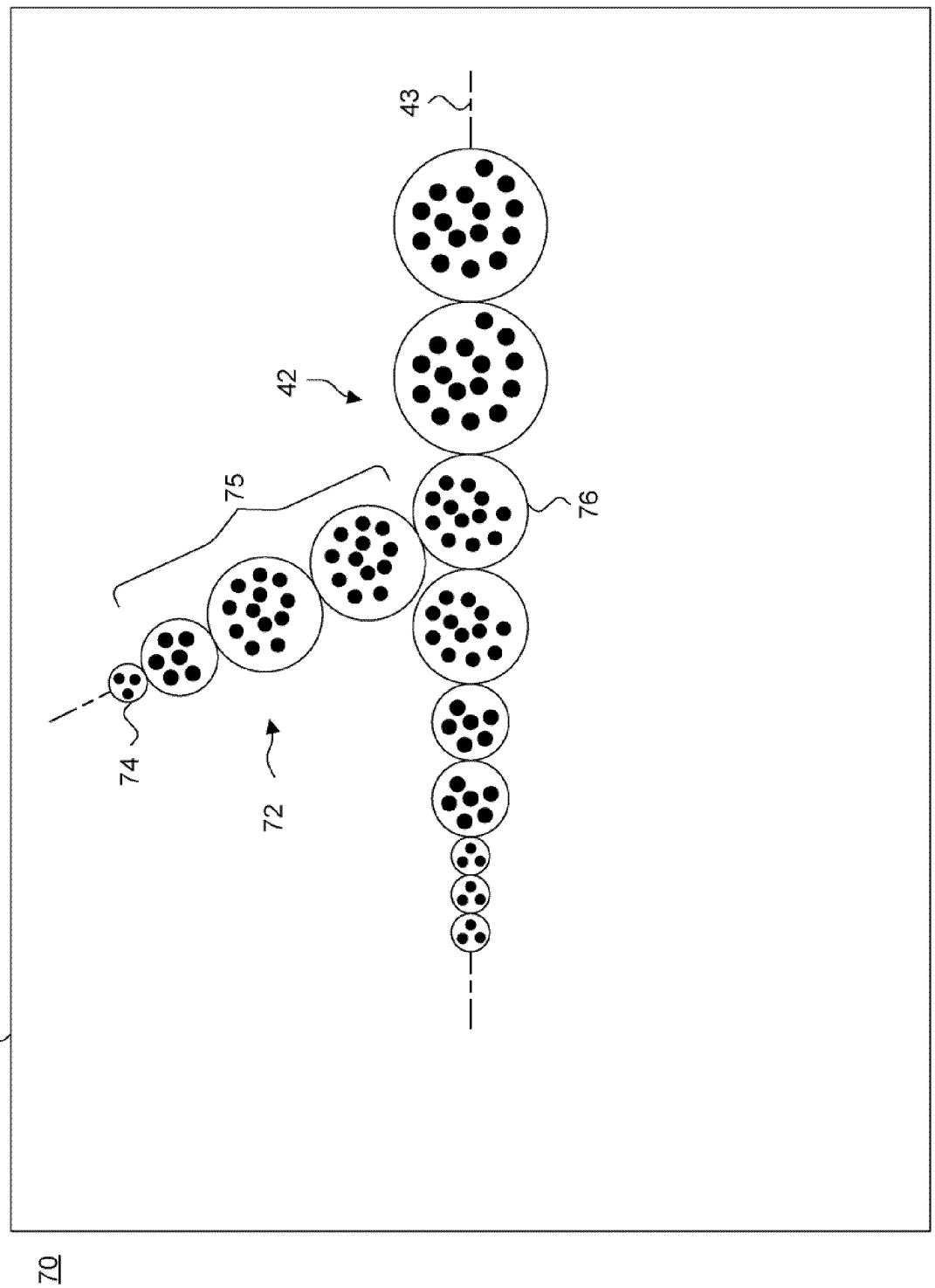
FIG. 5 is a data representation diagram showing, by way of example, a view of a thematically-related cluster spine grafted onto the cluster spine of FIG. 3.

FIG. 5 is a data representation diagram 70 showing, by way of example, a view 71 of a thematically-related cluster spine 72 grafted onto the cluster spine 42 of FIG. 3. Each cluster in the cluster spine 72, including endpoint cluster 74 and midpoint clusters 75, share concepts in common with the midpoint cluster 76 of the cluster spine 42. Accordingly, the cluster spine 72 is "grafted" onto the cluster spine 42 at an open edge of an available anchor point on midpoint cluster 76. The combined grafted clusters form a cluster grouping or "grouper" of clusters sharing related or similar themes.

Figure 6:
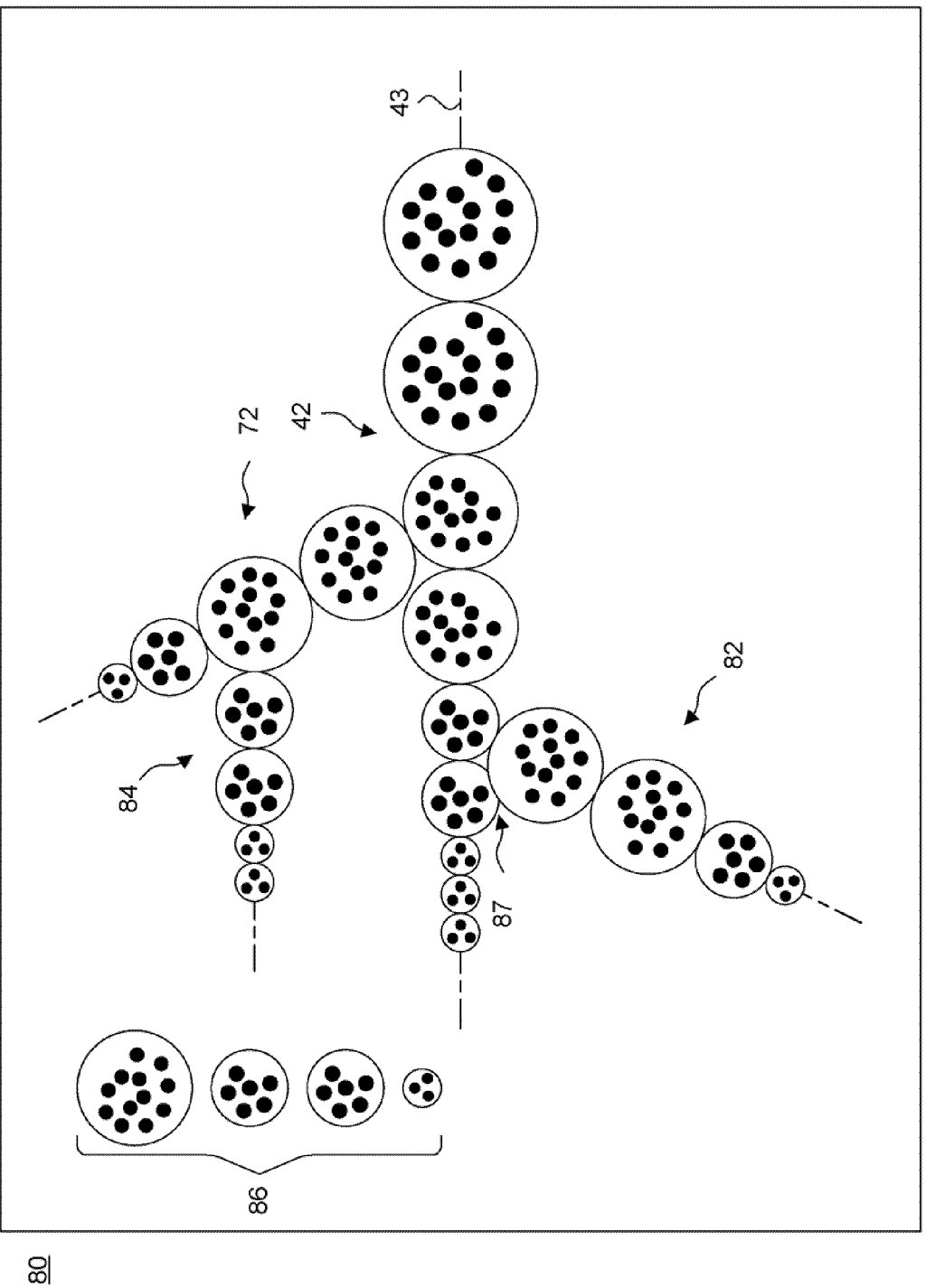
FIG. 6 is a data representation diagram showing, by way of example, a view of singleton clusters and further thematically-related cluster spines grafted onto the cluster spine of FIG. 5.

FIG. 6 is a data representation diagram 80 showing, by way of example, a view 81 of singleton clusters 86 and further thematically-related cluster spines 82 and 84 grafted onto the cluster spine 42 of FIG. 3. The clusters in the cluster spines 82 and 84 share concepts in common with the clusters of cluster spine 42 and are grafted onto the cluster spine 82 at open edges of available anchor points. Slight overlap 87 between grafted clusters is allowed. In the described embodiment, no more than 20% of a cluster can be covered by overlap. The singleton clusters 86, however, do not thematically relate to the clusters in cluster spines 42, 72, 82, 84 and are therefore grouped as individual clusters in non-relational placements.

Figure 7:
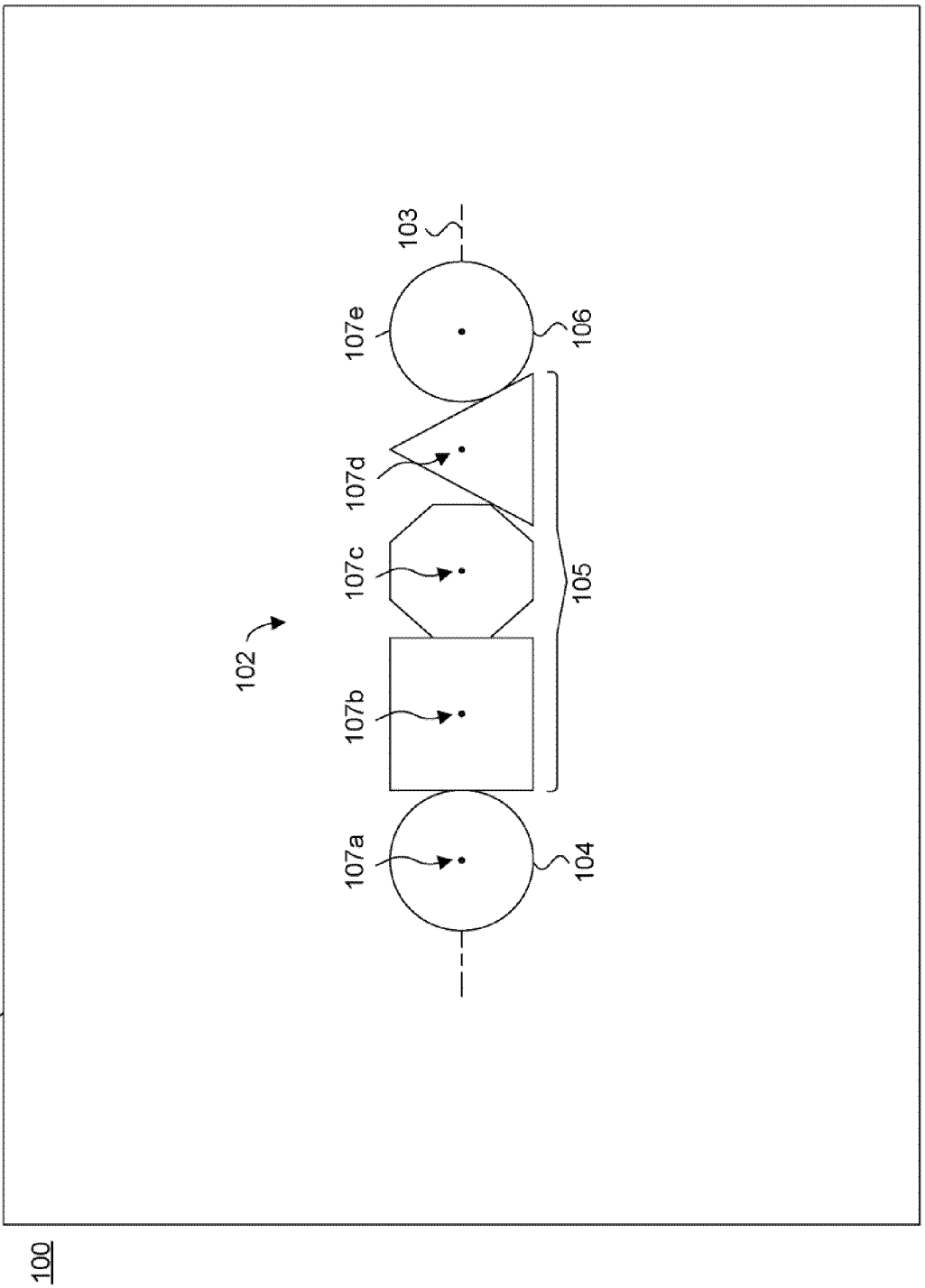
FIG. 7 is a data representation diagram showing, by way of example, a view of a cluster spine of non-circular clusters generated by the cluster display system of FIG. 1.

FIG. 7 is a data representation diagram 100 showing, by way of example, a view 101 of a cluster spine 102 of non-circular clusters 104-106 generated by the cluster display system of FIG. 1. Each cluster in the cluster spine 102, including endpoint clusters 104, 106 and midpoint clusters 105, has a center of mass $c_m$ 107a-e and is oriented along a common vector 103.

As described above, with reference to FIG. 3, each cluster 104-106 represents multi-dimensional data modeled in a two-dimensional visual display space. Each cluster 104-106 is non-circular and defines a convex volume representing data located within the multi-dimensional concept space. The center of mass $c_m$ 107a-e for each cluster 104-106 is logically located within the convex volume and is used to determine open edges at each anchor point. A segment is measured from the center of mass $c_m$ 107a-e for each cluster 104-106. An open edge is formed at the intersection of the segment and the edge of the non-circular cluster. By way of example, the clusters 104-106 represent non-circular shapes that are convex and respectively comprise a circle, a square, an octagon, a triangle, and an oval, although other forms of convex shapes could also be used, either singly or in combination therewith, as would be recognized by one skilled in the art.

Figure 8:
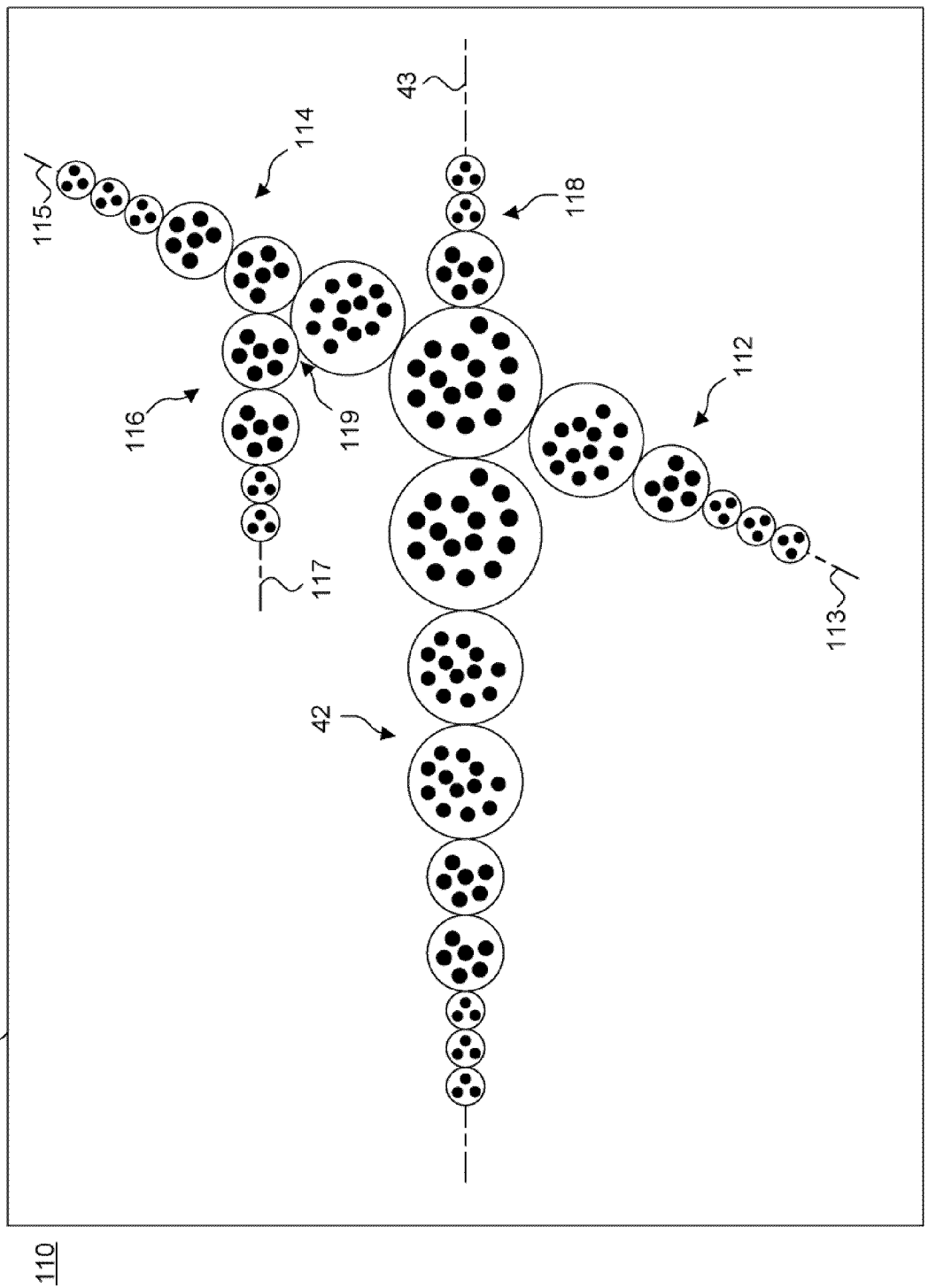
FIG. 8 is a data representation diagram showing, by way of example, a view of a thematically-related cluster spine grafted onto an end-point cluster of the cluster spine of FIG. 3.

FIG. 8 is a data representation diagram 110 showing, by way of example, a view 111 of a thematically-related cluster spine grafted onto an end-point cluster of the cluster spine of FIG. 3.

Further thematically-related cluster spines 112, 114, 116, 118 are grafted into the cluster spine 62. The cluster spines 112, 114, 118 are grafted into the largest endpoint cluster of the cluster spine 62 with the cluster spine 112 oriented along a forward-facing axis 113 and the cluster spine 114 oriented along a backward-facing axis 115. The cluster spine 116 is grafted onto a midpoint cluster of the cluster spine 114 along a backward-facing axis 117. Note the cluster spine 116 has overlap 119 with a cluster in the cluster spine 114.

Figure 9:
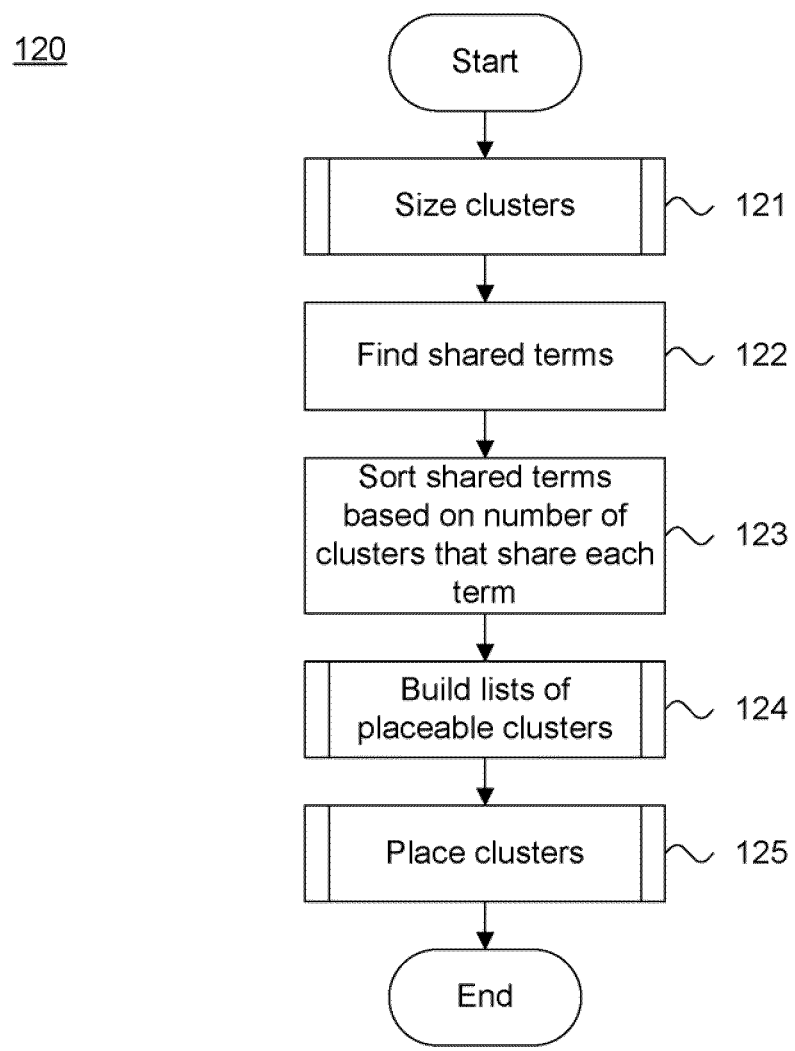
FIG. 9 is a flow diagram showing a method for arranging concept clusters in thematic relationships in a two-dimensional visual display space, in accordance with the present invention.

FIG. 9 is a flow diagram 120 showing a method for arranging concept clusters in thematic relationships in a two-dimensional visual display space, in accordance with the present invention. The method presents arbitrarily dimensioned concept data visualized in a two-dimensional visual display space in a manner that preserves independent data relationships between clusters.

First, individual clusters are sized by number of concepts (related documents) contained in each cluster (block 121), as further described below with reference to FIG. 10. The sized clusters are then analyzed to find shared terms (block 122). In the described embodiment, those clusters sharing one or more semantically relevant concepts are considered thematically-related.

The lists of shared terms are then sorted into sublists of clusters based on the number of clusters that share each term (block 123). The sublists are arranged in order of decreasing cluster size. Next, lists of placeable clusters are built (block 124), as further described below with reference to FIG. 11. Each list contains those clusters sharing a common theme and which had not yet been placed in the visual display space. The clusters in each sublist are placed into individual groupings or "groupers" to form cluster spines (block 125), as further described below with reference to FIG. 12. The method then terminates.

Figure 10:
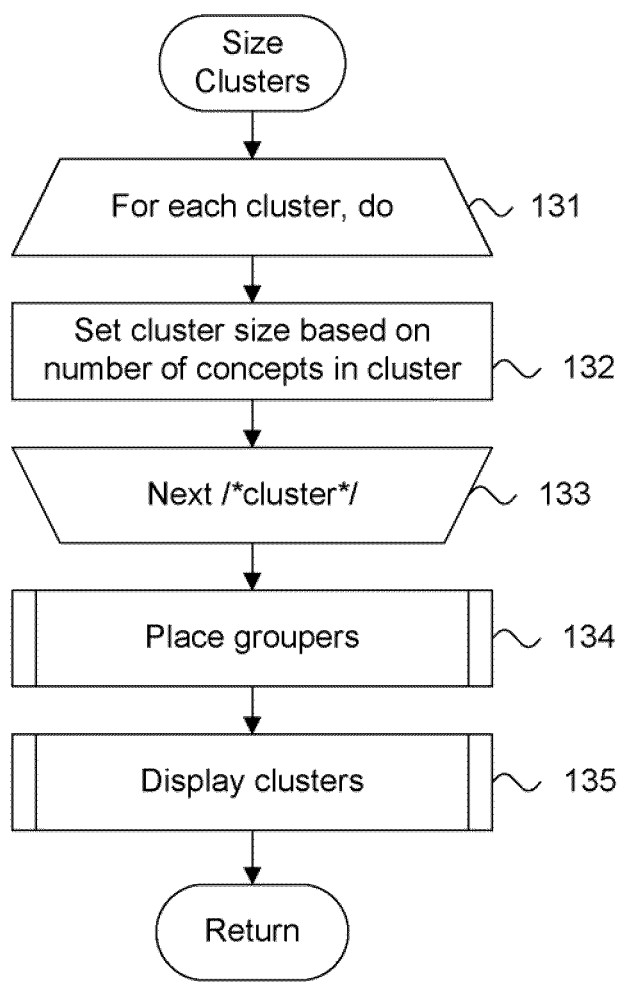
FIG. 10 is a routine for sizing clusters for use in the method of FIG. 8.

FIG. 10 is a routine for sizing clusters 130 for use in the method of FIG. 8. The purpose of this routine is to determine the size of each cluster based on the number of concepts contained in the cluster.

Each cluster is iteratively sized in a processing loop (blocks 131-133) as follows. For each cluster processed in the processing loop (block 131), the cluster size is set to equal the number of concepts contained in the cluster (block 132). Iterative processing continues (block 133) for each remaining cluster. The groupers are then placed into the visual display space (block 134), as further described below with reference to FIG. 13. Finally, the placed groupers are displayed (block 135), after which the routine terminates.

Figure 11:
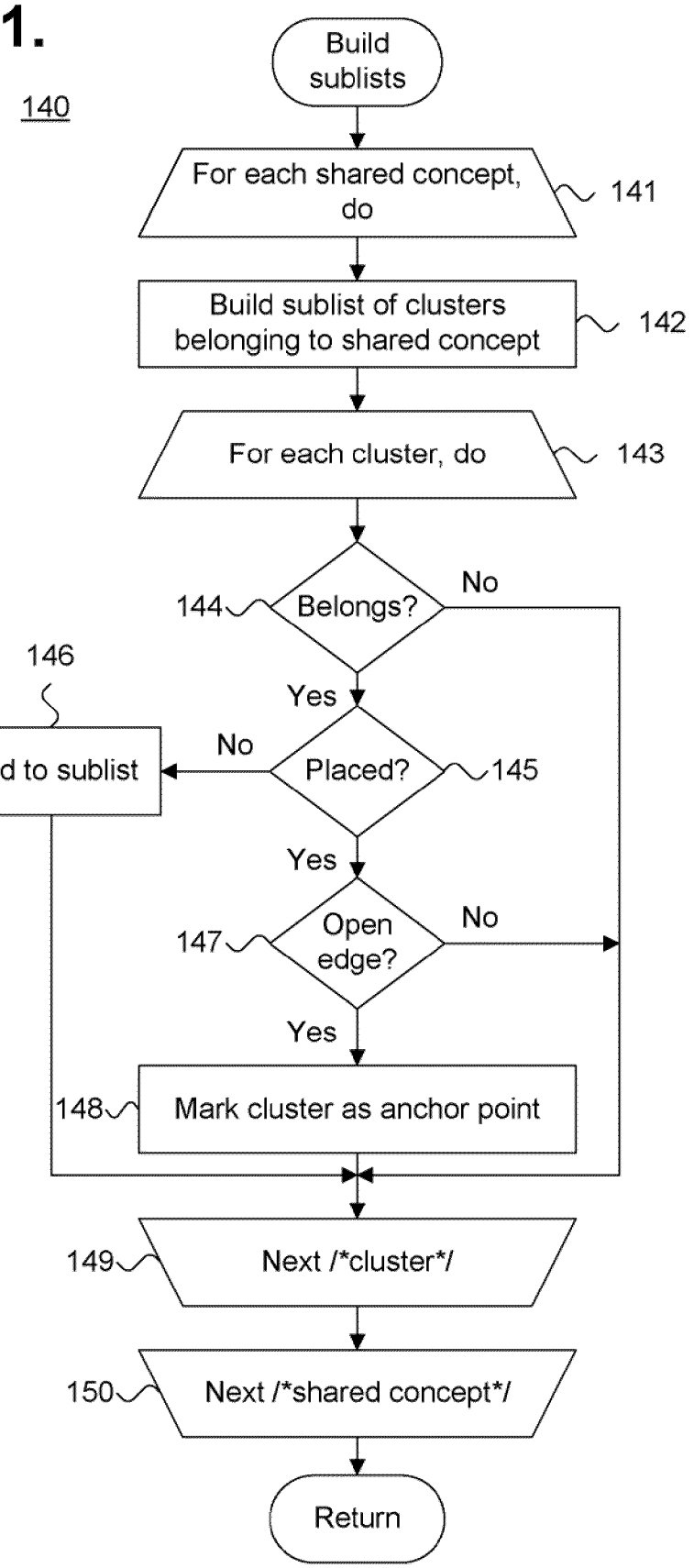
FIG. 11 is a routine for building sublists of placeable clusters for use in the method of FIG. 8.

FIG. 11 is a flow diagram showing a routine for building sublists of placeable clusters 140 for use in the method of FIG. 9. The purpose of this routine is to build sublists of thematically-related clusters to form individual cluster spines. The cluster spines are the building blocks used to form cluster groupings or "groupers."

The sublists are built by iteratively processing each shared concept in an outer processing loop (blocks 141-150) as follows. For each new shared concept processed in the outer processing loop (block 141), a sublist of clusters belonging to the shared concept is built (block 142). A cluster center represents a seed value originating from the shared concept. A seed value typically consists of the core set of concepts, preferably including one or more concepts, which form the basis of the current sublist. Thereafter, each of the clusters is iteratively processed in an inner processing loop (blocks 143-149) to determine sublist membership, as follows.

For each cluster processed in the inner processing loop (block 143), if the cluster does not belong to the current sublist (block 144), that is, the cluster does not share the common concept, the cluster is skipped (block 149). Otherwise, if the cluster has not already been placed in another sublist (block 145), the cluster is added to the current sublist (block 146). Otherwise, if the cluster has been placed (block 145) and has an open edge (block 147), the cluster is marked as an anchor point (block 148). Iterative processing of each cluster (block 149) and shared concept (block 150) continues, after which the routine returns.

Figure 12A:
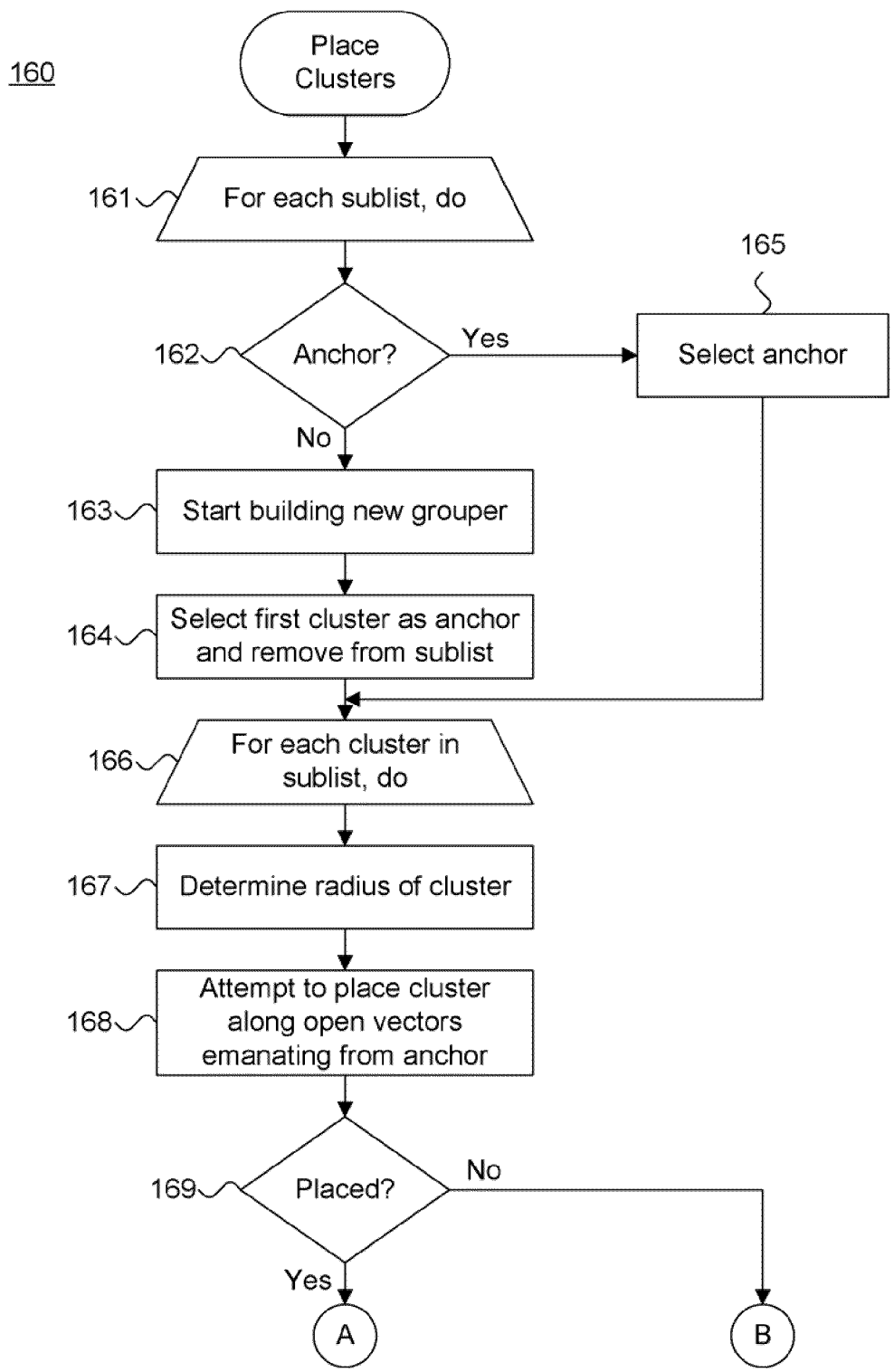
FIGS. 12(A)-(B) are a routine for placing clusters for use in the method of FIG. 8.
Figure 12B:
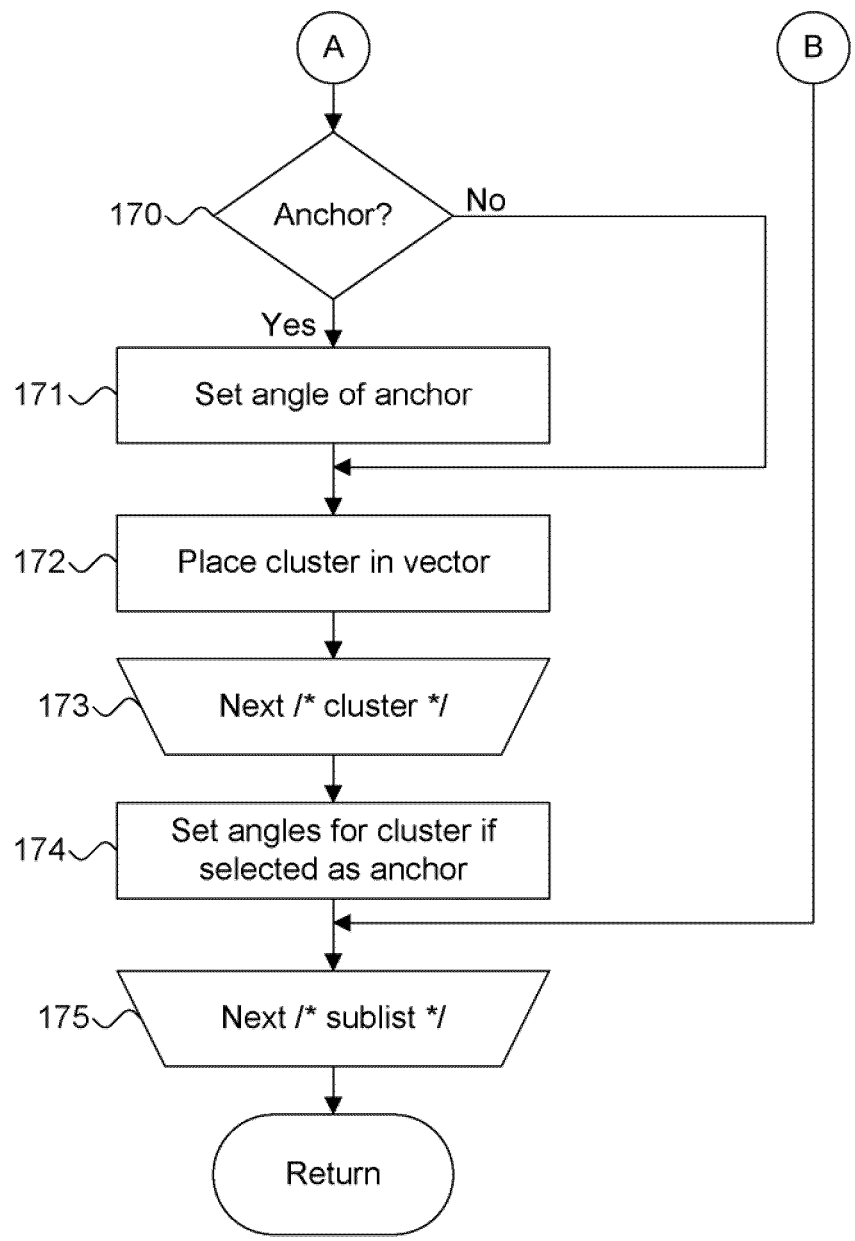

FIGS. 12(A)-(B) are a routine for placing clusters 160 for use in the method of FIG. 9. The purpose of this routine is to form cluster groupings or "groupers" of grafted cluster spines.

Each sublist of placeable clusters is iteratively processed in an outer processing loop (blocks 161-175), as follows. For each sublist processed in the outer processing loop (block 161), if the sublist includes an anchor point (block 162), the anchor point is selected (block 165). Otherwise, a new grouper is started (block 163) and the first cluster in the sublist is selected as the anchor point and removed from the sublist (block 164). Each cluster in the sublist is then iteratively processed in an inner processing loop (block 166-173), as follows.

For each cluster processed in the inner processing loop (block 166), the radius of the cluster is determined (block 167) and the routine attempts to place the cluster along the open vectors emanating from the anchor point (block 168). The radius is needed to ensure that the placed clusters do not overlap. If the cluster was not successfully placed (block 169), the cluster is skipped and processed during a further iteration (block 175). Otherwise, if the cluster is successfully placed (block 169) and is also designated as an anchor point (block 170), the angle of the anchor point is set (block 171), as further described below with reference to FIGS. 12(A)-(B).

The cluster is then placed in the vector (block 172). Processing continues with the next cluster (block 173).

Upon the completion of the processing of each cluster in the sublist (block 166), the angle for the cluster is set if the cluster is selected as an anchor point for a grafted cluster (block 174). Processing continues with the next sublist (block 175), after which the routine returns.

FIG. 13 is a graph 180 showing, by way of example, an anchor point within a cluster spine generated by the cluster display system of FIG. 1. Anchor points 186, 187 are formed along an open edge at the intersection of a vector 183a, 183b, respectively, drawn from the center 182 of the cluster 181. The vectors are preferably drawn at a normalized angle, such as 60° in the described embodiment, relative to the vector 188 forming the cluster spine.

A cluster 181 functioning as an anchor point can have one or more open edges depending upon the placement of adjacent clusters and upon whether the cluster 181 is the largest endpoint, smallest endpoint or, as shown, midpoint cluster. In the described embodiment, largest endpoint clusters have four open edges, smallest endpoint clusters have three open edges, and midpoint clusters have two open edges. Adjusting the normalized angle and allowing more (or less) overlap between grafted cluster spines are possible to allow for denser (or sparser) cluster placements.

Figure 14:
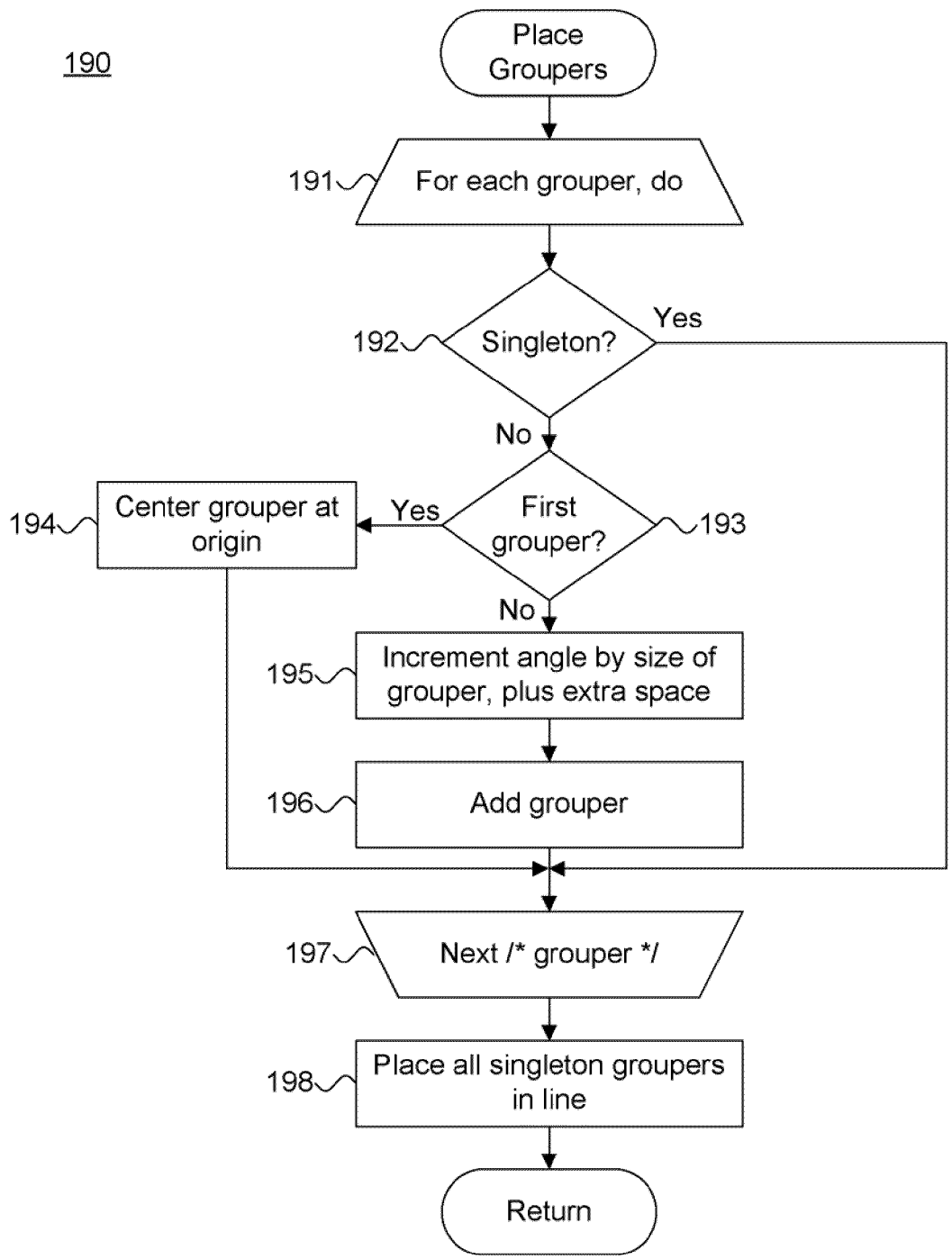
FIG. 14 is a routine for placing groupers for use in the method of FIG. 8.

FIG. 14 is a routine for placing groupers 190 in the use of the method of FIG. 9. The purpose of this routine is to place groupings of cluster sublists into a visual display space.

Each of the groupers is iteratively processed in a processing loop (blocks 191-197), as follows. For each grouper processed in the processing loop (block 191), if the grouper comprises a singleton cluster (block 192), the grouper is skipped (block 197). Otherwise, if the grouper is the first grouper selected (block 193), the grouper is centered at the origin of the visual display space (block 194). Otherwise, the angle of the grouper and radius from the center of the display are incremented by the size of the grouper, plus extra space to account for the radius of the end-point cluster at which the cluster is grafted (block 195) until the grouper can be placed without substantially overlapping any previously-placed grouper. Slight overlap within 20° between clusters is allowed. A grouper is added to the display space (block 196). Iterative processing continues with the next grouper (block 197). Finally, all singleton groupers are placed in the display space (block 198). In the described embodiment, the singleton groupers are placed arbitrarily in the upper left-hand corner, although other placements of singleton groupers are possible, as would be recognized by one skilled in the art. The routine then returns.

Although the foregoing method 120 of FIG. 9 has been described with reference to circular clusters, one skilled in the art would recognize that the operations can be equally applied to non-circular clusters forming closed convex volumes.

While the invention has been particularly shown and described as referenced to the embodiments thereof, those skilled in the art will understand that the foregoing and other changes in form and detail may be made therein without departing from the spirit and scope of the invention.

What is claimed is:

1. A system for thematically arranging clusters in a visual display, comprising:
    a database to store clusters, each comprising one or more concepts, wherein each concept comprises terms that have common semantic meaning;
    a placement module to select the clusters, comprising:
        a list building submodule to identify two or more of the clusters with shared concepts; and
        a cluster placement submodule to place the two or more clusters along a vector to form one or more cluster spines each represented by the shared concepts as a theme, to select one of the cluster spines, to identify at least one anchor point located on an open edge of one of the clusters along the selected cluster spine, and to graft a further thematically-related cluster spine onto one of the at least one anchor points of the selected cluster spine;
    a display to visually provide the grafted cluster spines; and
    a central processing unit to execute the modules.

2. A system according to claim 1, wherein the cluster placement submodule orders the two or more clusters along the vector based on cluster size, which is determined by the one or more concepts associated with each cluster.

3. A system according to claim 1, wherein the further cluster spine is grafted at an angle along at least one of a forward-facing axis and a backward-facing axis.

4. A system according to claim 1, wherein the anchor point associated with one of the clusters is determined based on a location of that cluster and placement of adjacent clusters.

5. A system according to claim 1, wherein the selected cluster spine is selected first and placed in a center of a display space, and one or more of the further cluster spines are subsequently placed in relation to the selected cluster spine.

6. A method for thematically arranging clusters in a visual display, comprising the steps of:
    storing clusters, each comprising one or more concepts, wherein each concept comprises terms that have common semantic meaning;
    grouping the clusters, comprising:
        identifying two or more of the clusters with shared concepts and placing the two or more clusters along a vector to form one or more cluster spines each represented by the shared concepts as a theme;
        selecting one of the cluster spines and identifying at least one anchor point located on an open edge of one of the clusters along the selected cluster spine; and
        identifying a further cluster spine that is thematically-related to the selected cluster spine and grafting the further cluster spine onto one of the at least one anchor points of the selected cluster spine; and
    displaying the grafted cluster spines, wherein the steps are performed by a central processing unit.

7. A method according to claim 6, further comprising:
    ordering the two or more clusters along the vector based on cluster size, which is determined by the one or more concepts associated with each cluster.

8. A method according to claim 6, further comprising:
    grafting the further cluster spine at an angle along at least one of a forward-facing axis and a backward-facing axis.

9. A method according to claim 6, wherein the anchor point associated with one of the clusters is determined based on a location of that cluster and placement of adjacent clusters.

10. A method according to claim 6, wherein the selected cluster spine is selected first and placed in a center of a display space, and one or more of the further cluster spines are subsequently placed in relation to the selected cluster spine.

11. A system for placing thematically-related cluster groupings into a visual display, comprising:
    a database to maintain clusters, each comprising one or more concepts, wherein each concept comprises terms that have common semantic meaning;
    a placement module to group the clusters, comprising:
        a cluster placement submodule to form cluster spines each comprising two or more of the clusters having a common theme and placed along a vector, wherein the theme comprises the concepts shared between the two or more clusters, to select one of the cluster spines, to identify at least one anchor point located on an open edge of at least one of the clusters along the selected cluster spine, and to graft at least one remaining cluster spine onto one of the anchor points of the selected cluster spine;

a display to visually provide the grouped cluster spines; and a central processing unit to execute the modules.

12. A system according to claim 11, wherein the cluster placement submodule places the two or more clusters along the vector based on cluster size, which is determined by the one or more concepts associated with each cluster.

13. A system according to claim 11, wherein the remaining cluster spine is grafted at an angle along at least one of a forward-facing axis and a backward-facing axis.

14. A system according to claim 11, wherein the at least one anchor point associated with one of the clusters is determined based on a location of that cluster and placement of adjacent clusters.

15. A system according to claim 11, wherein the selected cluster spine is selected first and placed in a center of a display space, and one or more of the remaining cluster spines are subsequently placed in relation to the selected cluster spine.

16. A method for placing thematically-related cluster groupings into a visual display, comprising the steps of:
maintaining clusters, each comprising one or more concepts, wherein each concept comprises terms that have common semantic meaning;
grouping the clusters, comprising:
forming cluster spines each comprising two or more of the clusters having a common theme and placed along a vector, wherein the theme comprises the concepts shared between the two or more clusters;
selecting one of the cluster spines and identifying at least one anchor point located on an open edge of at least one of the clusters along the selected cluster spine; and
identifying at least one remaining cluster spine that is thematically-related to the selected cluster spine and grafting the remaining cluster spine onto one of the anchor points of the selected cluster spine; and
displaying the grouped cluster spines, wherein the steps are performed by a central processing unit.

17. A method according to claim 16, further comprising:
placing the two or more clusters along the vector based on cluster size, which is determined by the one or more concepts associated with each cluster.

18. A method according to claim 16, further comprising:
grafting the remaining cluster spine at an angle along at least one of a forward-facing axis and a backward-facing axis.

19. A method according to claim 16, wherein the anchor points associated with one of the clusters are determined based on a location of that cluster and placement of adjacent clusters.

20. A method according to claim 16, wherein the selected cluster spine is selected first and placed in a center of a display space, and one or more of the remaining cluster spines are subsequently placed in relation to the selected cluster spine.

* * * * *